United States Patent
Ewinger et al.

(10) Patent No.: US 6,951,528 B2
(45) Date of Patent: Oct. 4, 2005

(54) METHOD FOR OPERATING A MOTOR-DRIVEN VEHICLE

(75) Inventors: Heinz Ewinger, Oberasbach (DE); Armin Farrenkopf, Nuremberg (DE); Juergen Groth, Nuremberg (DE); Thomas Just, Erlangen (DE)

(73) Assignee: Conti Temic microelectronic GmbH, Nuremberg (DE)

(*) Notice: Subject to any disclaimer, the term of this patent is extended or adjusted under 35 U.S.C. 154(b) by 0 days.

(21) Appl. No.: 10/433,723

(22) PCT Filed: Dec. 1, 2001

(86) PCT No.: PCT/EP01/14057
§ 371 (c)(1),
(2), (4) Date: Jun. 3, 2003

(87) PCT Pub. No.: WO02/46017
PCT Pub. Date: Jun. 13, 2002

(65) Prior Publication Data
US 2004/0043868 A1 Mar. 4, 2004

(30) Foreign Application Priority Data
Dec. 8, 2000 (DE) .......... 100 61 006

(51) Int. Cl.⁷ .......... B60K 41/20; B60K 41/26
(52) U.S. Cl. .......... 477/195; 477/199; 477/906; 192/219.4
(58) Field of Search .......... 477/906, 96, 184, 477/194–195, 199; 192/219.4; 180/286

(56) References Cited

U.S. PATENT DOCUMENTS

| | | | |
|---|---|---|---|
| 3,939,940 A | * 2/1976 | Sasabe et al. | 180/269 |
| 4,629,043 A | * 12/1986 | Matsuo et al. | 477/184 |
| 4,892,014 A | 1/1990 | Morell et al. | |
| 5,394,137 A | * 2/1995 | Orschek | 340/453 |
| 5,417,624 A | * 5/1995 | Weissbrich et al. | 477/71 |
| 5,580,136 A | 12/1996 | Hanschek | |
| 5,630,489 A | * 5/1997 | Bebernes | 192/219.4 |
| 5,916,062 A | * 6/1999 | Siepker | 477/194 |
| 6,234,525 B1 | * 5/2001 | Schroder et al. | 280/748 |
| 6,589,134 B2 | * 7/2003 | Williams et al. | 192/219.4 |
| 6,631,796 B2 | * 10/2003 | Yanaka et al. | 192/219.4 |

FOREIGN PATENT DOCUMENTS

| | | | |
|---|---|---|---|
| DE | 3642874 | 6/1988 | |
| DE | 19814657 | 10/1999 | |
| DE | 19908062 | 8/2000 | |
| EP | 1063453 | 12/2000 | |
| GB | 1448416 | * 9/1976 | |
| JP | 354031121 A | * 3/1979 | 180/270 |
| JP | 358110344 A | * 6/1983 | 477/184 |
| JP | 406137415 A | * 5/1994 | 477/194 |
| JP | 407101319 A | * 4/1995 | |

* cited by examiner

*Primary Examiner*—Roger Pang
(74) *Attorney, Agent, or Firm*—W. F. Fasse; W. G. Fasse

(57) ABSTRACT

To avoid damaging the electrical braking system of a motor vehicle due to driving with an applied parking brake, the parking brake is automatically released, if the speed of the motor vehicle exceeds a prescribed minimum value, and the drive unit of the motor vehicle is driven in a specific operating state, and at least one operating element (e.g. gas pedal, gear shift lever, clutch pedal, safety belt, etc.) of the motor vehicle has been actuated by the driver of the motor vehicle. Sensor signals of sensors that sense the state of the above parameters are subjected to a plausibility check.

12 Claims, 1 Drawing Sheet

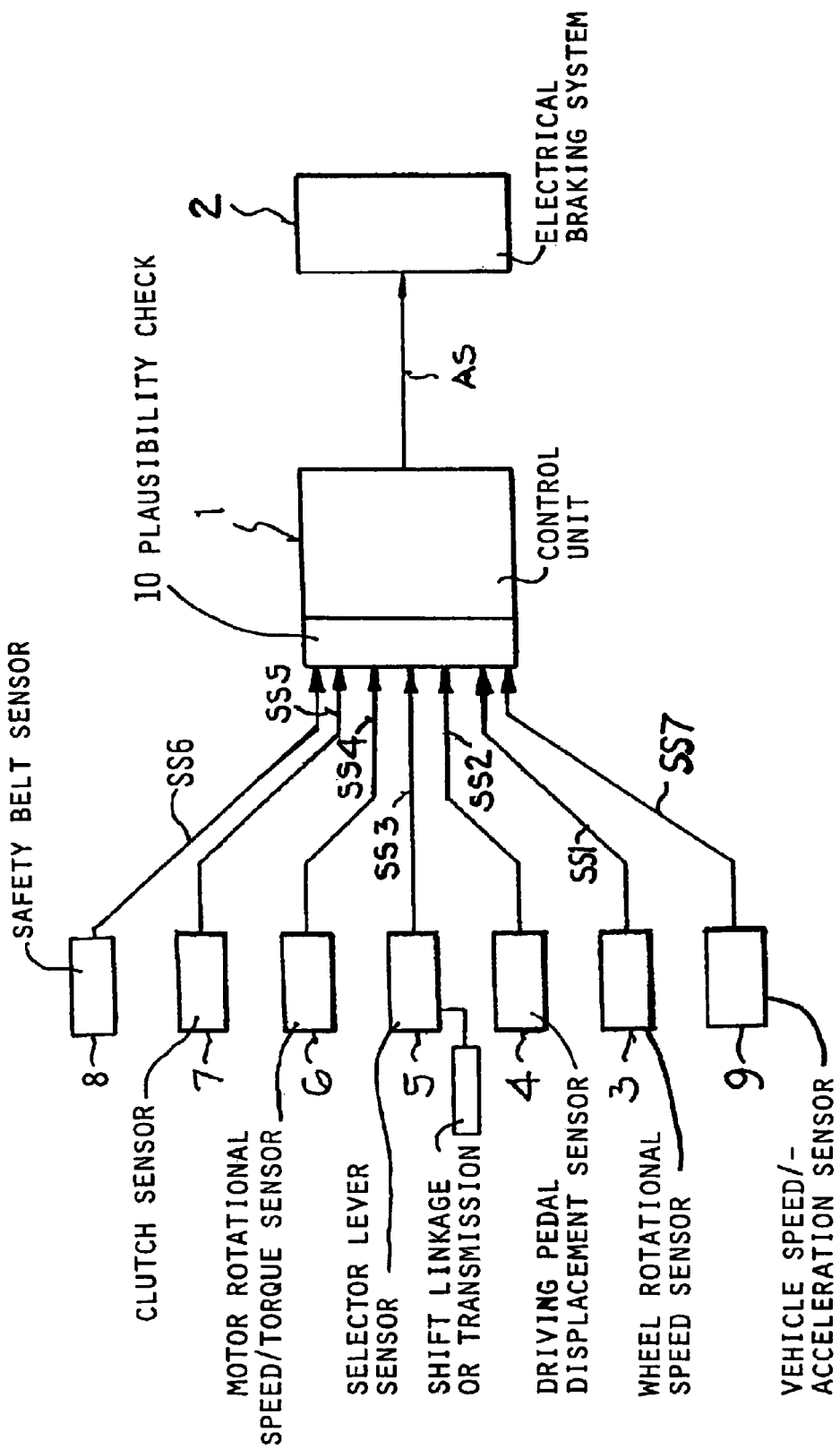

METHOD FOR OPERATING A MOTOR-DRIVEN VEHICLE

FIELD OF THE INVENTION

The invention relates to a method of controlling a parking brake of a motor vehicle.

BACKGROUND INFORMATION

In motor-driven vehicles, a parking brake is generally provided for arresting or fixing the motor vehicle at a standstill and especially in connection with the parking of the motor vehicle. When again beginning to drive the motor vehicle, the releasing of the set parking brake can be forgotten by the operator of the motor vehicle; the driving with a set or applied parking brake can, however, lead to an impairment or damage of the braking system of the motor vehicle. As a result, driving with a set or applied parking brake should be avoided.

From the German Patent Publication DE 198 14 657 A1 with a control and/or regulating arrangement for an electrical parking brake arrangement of motor vehicles, forming the general background of this art, it is known to provide a sensor unit for measuring the wheel rotational speed of the vehicle, by means of which the two driving conditions, standstill or parking and driving, of the vehicle can be recognized. With this information by itself, a driving of the motor vehicle is often erroneously assumed, even in connection with an undesired and unintended rolling of the vehicle (for example due to diminishing or slackening braking force or insufficient setting or applying of the parking brake), whereby critical situations impairing the safety can arise.

SUMMARY OF THE INVENTION

The underlying object of the invention is to propose a simple method for operating a motor-driven motor vehicle with a high reliability and safety.

The above object has been achieved according to the invention in a method of operating a parking brake of a motor vehicle, comprising steps:
 a) detecting a wheel rotational speed of a wheel of the motor vehicle using a wheel rotational speed sensor;
 b) comparing the wheel rotational speed to a prescribed first threshold;
 c) detecting a motor operating condition of a motor of the motor vehicle using at least one of a motor rotational speed sensor and a motor torque sensor;
 d) determining whether the motor operating condition indicates that the motor is running;
 e) detecting a lever position of a gear shift lever or gear selector lever of the motor vehicle using at least one lever position sensor connected to a shifting linkage or a transmission of the motor vehicle;
 f) evaluating the lever position to determine therefrom whether a gear of the transmission is engaged; and
 g) automatically releasing the parking brake if all of at least the following mandatory conditions pertain: the step b) determines that the wheel rotational speed exceeds the first threshold, the step d) determines that the motor is running, and the step f) determines that the gear is engaged.

The above object has further been achieved according to another aspect of the invention in a method of operating a parking brake of a motor vehicle, comprising steps:

a) detecting a speed of the motor vehicle;
 b) determining whether the speed exceeds a prescribed speed threshold;
 c) detecting an actual operating state of a drive unit of the motor vehicle;
 d) determining whether the actual operating state corresponds to a prescribed operating state;
 e) detecting an actual actuation state of at least one operating element selected from the group consisting of a gear shift lever, a gear selector lever, a driving accelerator pedal, a clutch pedal, and a safety belt of the motor vehicle;
 f) determining whether the actual actuation state corresponds to a prescribed actuation state;
 g) evaluating the speed, the actual operating state and the actual actuation state as to respective plausibility thereof with reference to prescribed plausibility criteria; and
 h) automatically releasing the parking brake only if at least the speed exceeds the prescribed speed threshold, the actual operating state corresponds to the prescribed operating state, the actual actuation state corresponds to the prescribed actuation state, and the speed, the actual operating state and the actual actuation state are respectively determined to be plausible.

Still further, the above object has been achieved according to another aspect of the invention in a method of operating a parking brake of a motor vehicle, comprising steps:
 a) detecting a wheel rotation speed of at least one wheel of the motor vehicle;
 b) determining whether the speed exceeds a prescribed speed threshold;
 c) detecting an actual operating state of a drive unit of the motor vehicle;
 d) determining whether the actual operating state corresponds to a prescribed operating state;
 e) detecting whether a safety belt of the motor vehicle is secured; and
 f) automatically releasing the parking brake only if at least the speed exceeds the prescribed speed threshold, the actual operating state corresponds to the prescribed operating state, and the safety belt is secured.

The (electrical) parking brake is deactivated upon the presence of a desired driving state or mode of the motor vehicle, that is to say, the parking brake is automatically released when, on the one hand, a movement or motion of the motor vehicle exists, and on the other hand, the movement or motion of the motor vehicle was intended and willfully initiated by the operator of the motor vehicle. Especially, the exceeding of a specific minimum speed is defined as the motion or movement of the motor vehicle (for example the exceeding of a speed of 1.5 km/h), and the driving of the drive unit of the motor vehicle in a specific operating state or mode and the actuation of at least one operating element of the motor vehicle that is to be actuated by the operator of the motor vehicle are defined as an unambiguous recognizable desire of the operator for the movement of the motor vehicle (for beginning to drive or driving away). As the operating state or mode of the drive unit of the motor vehicle, especially, the motor of the motor vehicle must be running and/or the transmission must be connected with the motor, that is to say as a result of a corresponding actuation of the gear shift lever of a manual shift transmission or of the selector lever of an automatic transmission, a gear must have been engaged by the operator. Especially the driving pedal (gas pedal) is utilized as the operating element of the motor vehicle that is to be actuated by the operator of the motor vehicle, that is to say the driving pedal (gas pedal) must have been stepped on by the operator of the motor vehicle to move it through a specific distance and/or the clutch pedal, that is to say the clutch pedal may not be stepped on all the way down (it must be coupled-in, the clutch must be released), thus a force flow must exist from the motor via the drive train to the wheels of the motor vehicle; optionally, the safety belt can be additionally utilized as the operating element of the motor vehicle that is to be actuated, that is to say the safety belt must be put on or must have been put on by the operator of the motor vehicle. With the aid of plausibility considerations, at least one of these criteria is evaluated, and from this a determination is made with respect to the driver's desire for the movement of the motor vehicle (for driving away or beginning to drive the motor vehicle). The movement of the motor vehicle can be determined, for example, by means of sensors for detecting the speed and/or the acceleration of the motor vehicle, for example by means of wheel rotational speed sensors and/or acceleration sensors or via an optical path distance measurement or via the transmission of the motor vehicle; the operating states or modes of the drive unit of the motor vehicle signaling the operator's desire for movement of the motor vehicle, and the actuations of the operating elements of the motor vehicle that are to be actuated can be determined from specific data of the motor vehicle that are characteristic thereof, and can be obtained from the measured values of suitable sensors, for example from the measured values of sensors for detecting the position of the driving pedal (gas pedal), from sensors for detecting the position of the gear shift lever or the selector lever (selector lever sensors), and sensors for detecting the operating state of the motor (for example rotational speed sensors for detecting the rotational speed of the motor and/or rotational moment or torque sensors for detecting the rotational moment or torque of the motor).

The basic informations underlying the method can be obtained in a simple manner, especially by means of sensors already present in the motor vehicle, so that driving with a set or applied parking brake can advantageously be prevented in a simple and cost-effective or economical manner, without the operator of the motor vehicle having to be bothered by or pay attention to this, and without the parking brake being unintentionally released. Thereby, a method that increases the safety in the driving traffic can thus be realized.

BRIEF DESCRIPTION OF THE DRAWINGS

In connection with the drawing, the invention shall be explained in further detail, whereby a schematic block circuit diagram for carrying out the method is shown in the FIGURE.

DETAILED DESCRIPTION OF A PREFERRED EXAMPLE EMBODIMENT OF THE INVENTION

According to the Figure, a control unit 1 (logic unit) is provided in the motor vehicle, to which control unit 1, sensor signals SS1, SS2, SS3, SS4, SS5, SS6 and SS7 of plural sensors 3, 4, 5, 6, 7, 8 and 9 (that is to say the measured values acquired from the sensors 3, 4, 5, 6, 7, 8 and 9) are delivered as input signals, and which, dependent on the sensor signals SS1, SS2, SS3, SS4, SS5, SS6, and SS7, actuates the electrical braking system 2 of the motor vehicle with an output signal AS (control signal) generated therefrom (for example by acting on the brake actuator for prescribing a specific braking force). The sensor signals SS1, SS2, SS3, SS4, SS5, SS6 and SS7 provide, as measured values, information on the one hand regarding the motion of the motor vehicle (and especially also regarding the speed of the motor vehicle in the motion), on the other hand regarding the desire of the operator of the motor vehicle (the driver's desire) for movement of the motor vehicle. As a sensor for detecting the motion of the motor vehicle, for example, at each wheel of the motor vehicle, a wheel rotational speed sensor 3 is provided, of which the sensor signals SS1 are utilized as a measure for the speed of the motor vehicle. As sensors for detecting the desire of the operator for the movement of the motor vehicle, there are provided, for example, a travel or displacement sensor 4 (sensor signal SS2) detecting the position of the gas pedal (driving pedal), a selector lever sensor 5 (sensor signal SS3) connected with the shifting linkage or the transmission and detecting the position of the gear shift lever, a motor rotational speed or torque sensor 6 (sensor signal S54) detecting the operating state of the motor (the motor data) by the detection of the motor rotational speed or torque, a clutch sensor 7 (sensor signal SS5) detecting the state of the clutch pedal, a safety belt sensor 8 (sensor signal SS6) detecting the state of a safety belt, and a vehicle speed or acceleration sensor 9 (sensor signal SS7). The sensor signals SS1, SS2, SS3, SS4, SS5, SS6 and SS7 of the sensors 3, 4, 5, 6, 7, 8 and 9 therewith the measured values thereof are evaluated by the control unit 1 (logic unit); the control unit 1 (logic unit) is arranged in the interior area or the exterior area of the motor vehicle and, for example, integrated in a control device of the motor vehicle, for example, in a control device arranged on the rear axle of the motor vehicle. In the evaluation, it is especially monitored or checked by the control unit 1 (logic unit), whether the speed of the motor vehicle exceeds a specific minimum speed of, for example, 1.5 km/h, whether the gas pedal (driving pedal) is being actuated by the operator of the motor vehicle, whether a gear is engaged, whether the clutch pedal is actuated (whether it is being clutched-in or clutched-out), whether the motor of the motor vehicle is running, and whether the safety belt is secured. With the aid of plausibility considerations, at least one of these criteria is evaluated in a plausibility check 10, and therefrom adetermination is made with respect to the drivers desire for starting to drive the vehicle: if it is assumed that the driver desires to start driving the motor vehicle, then, independent of the momentary state of the (electrical) parking brake, it is deactivated by appropriate action on the brake actuator of the electrical brake system 2 by the output signal AS of the control unit 1 (logic unit), that is to say the (electrical) parking brake is released.

What is claimed is:

1. A method of operating a parking brake of a motor vehicle, comprising steps:
    a) detecting a wheel rotational speed of a wheel of said motor vehicle using a wheel rotational speed sensor;
    b) comparing said wheel rotational speed to a prescribed first threshold;
    c) detecting a motor operating condition of a motor of said motor vehicle using at least one of a motor rotational speed sensor and a motor torque sensor;
    d) determining whether said motor operating condition indicates that said motor is running;
    e) detecting a lever position of a gear shift lever or gear selector lever of said motor vehicle using at least one lever position sensor connected to a shifting linkage or a transmission of said motor vehicle;

f) evaluating said lever position to determine therefrom whether a gear of said transmission is engaged; and g) automatically releasing said parking brake if all of at least the following mandatory conditions pertain: said step b) determines that said wheel rotational speed exceeds said first threshold, said step d) determines that said motor is running, and said step f) determines that said gear is engaged.

2. The method according to claim 1, wherein the step of automatically releasing said parking brake is carried out if only said mandatory conditions recited in said step g) pertain.

3. The method according to claim 1, further comprising detecting a state of a clutch of said motor vehicle, and wherein said mandatory conditions for automatically releasing said parking brake further include determining that said state of said clutch indicates that said clutch is engaged.

4. The method according to claim 1, further comprising detecting a state of a driving accelerator pedal of said motor vehicle, and wherein said mandatory conditions for automatically releasing said parking brake further include determining that said state of said driving accelerator pedal indicates that said driving accelerator pedal is being depressed.

5. The method according to claim 1, further comprising detecting a state of a safety belt of said motor vehicle, and wherein said mandatory conditions for automatically releasing said parking brake further include determining that said state of said safety belt indicates that said safety belt has been secured.

6. The method according to claim 1, further comprising evaluating said wheel rotational speed, said motor operating condition and said lever position as to respective plausibility thereof with reference to prescribed plausibility criteria, and carrying out said releasing of said parking brake only if said wheel rotational speed, said motor operating condition and said lever position are further determined to be plausible.

7. The method according to claim 1, wherein said step c) involves using said motor rotational speed sensor.

8. The method according to claim 1, wherein said step c) involves using said motor torque sensor.

9. The method according to claim 1, further comprising detecting a travel condition of said motor vehicle using at least one of a vehicle speed sensor and a vehicle acceleration sensor, and wherein said mandatory conditions for automatically releasing said parking brake further include determining that said travel condition of said motor vehicle exceeds a prescribed second threshold.

10. A method of operating a parking brake of a motor vehicle, comprising steps:

a) detecting a speed of said motor vehicle;

b) determining whether said speed exceeds a prescribed speed threshold;

c) detecting an actual operating stats of a drive unit of said motor vehicle;

d) determining whether said actual operating state corresponds to a prescribed operating state;

e) detecting an actual actuation state of at least one operating element selected from the group consisting of a gear shift lever, a gear selector lever, a driving accelerator pedal, a clutch pedal, and a safety belt of said motor vehicle;

f) determining whether said actual actuation state corresponds to a prescribed actuation state;

g) evaluating said speed, said actual operating state and said actual actuation state as to respective plausibility thereof with reference to prescribed plausibility criteria; and h) automatically releasing said parking brake only if at least said speed exceeds said prescribed speed threshold, said actual operating state corresponds to said prescribed operating state, said actual actuation state corresponds to said prescribed actuation state, and said speed, said actual operating state and said actual actuation state are respectively determined to be plausible.

11. The method according to claim 10, wherein said operating element is said safety belt and said prescribed actuation state is a secured state of said safety belt.

12. A method of operating a parking brake of a motor vehicle, comprising steps:

a) detecting a wheel rotation speed of at least one wheel of said motor vehicle;

b) determining whether said speed exceeds a prescribed speed threshold;

c) detecting an actual operating state of a drive unit of said motor vehicle;

d) determining whether said actual operating state corresponds to a prescribed operating state;

e) detecting whether a safety belt of said motor vehicle is secured; and f) automatically releasing said parking brake only if at least said speed exceeds said prescribed speed threshold, said actual operating state corresponds to said prescribed operating state, and said safety belt is secured.

* * * * *

UNITED STATES PATENT AND TRADEMARK OFFICE
CERTIFICATE OF CORRECTION

PATENT NO. : 6,951,528 B2
DATED : October 4, 2005
INVENTOR(S) : Ewinger et al.

It is certified that error appears in the above-identified patent and that said Letters Patent is hereby corrected as shown below:

Column 3,
Line 54, replace "FIGURE." with -- Figure. --;

Column 4,
Line 20, after "sensor signal", replace "S54" with -- SS4 --;
Line 27, after "9", insert -- and --;
Line 44, after "therefrom", replace "adetermination" with -- a determination --;
Line 44, after "to the", replace "drivers" with -- driver's --;

Column 6,
Line 4, after "operating", replace "stats" with -- state --.

Signed and Sealed this

Seventh Day of February, 2006

JON W. DUDAS
*Director of the United States Patent and Trademark Office*